Feb. 27, 1934.  J. W. WOOD  1,949,343
APPLYING AND REMOVING TOOL
Filed Sept. 25, 1933   2 Sheets-Sheet 1
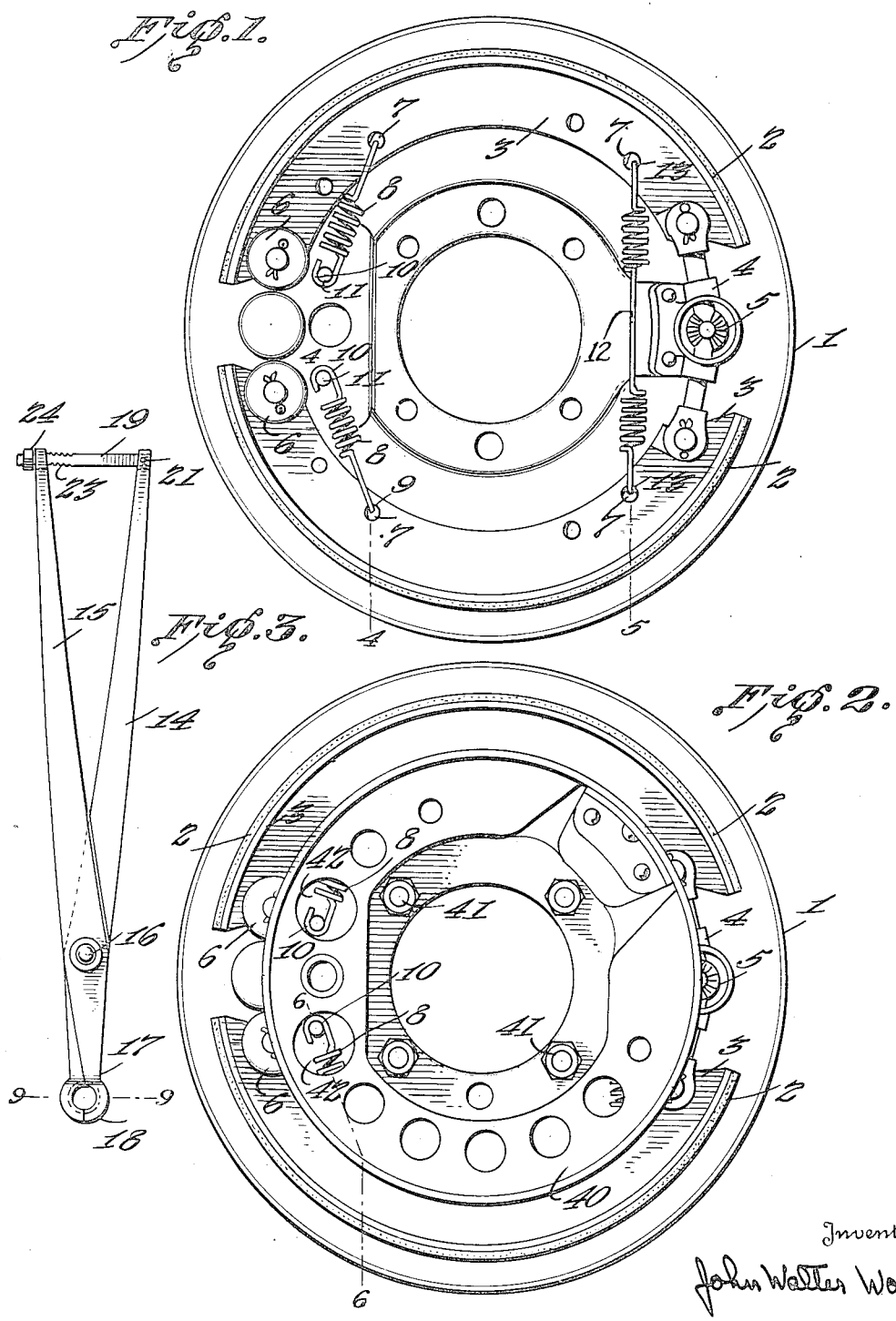

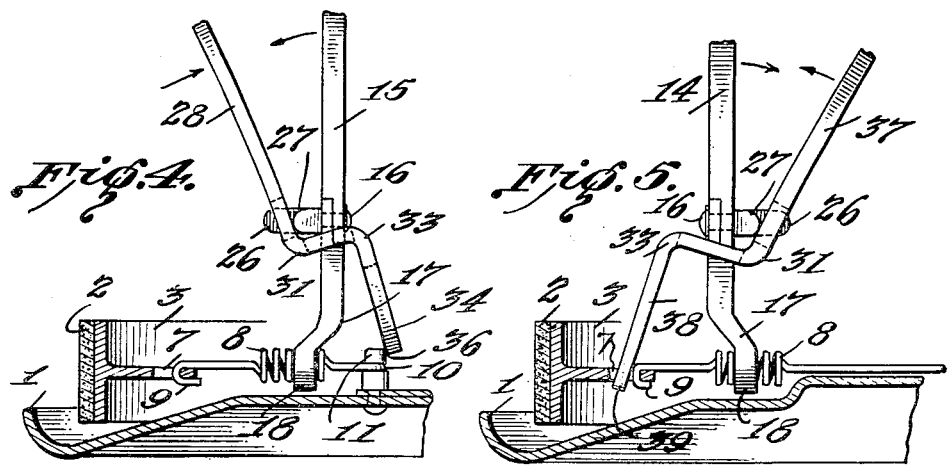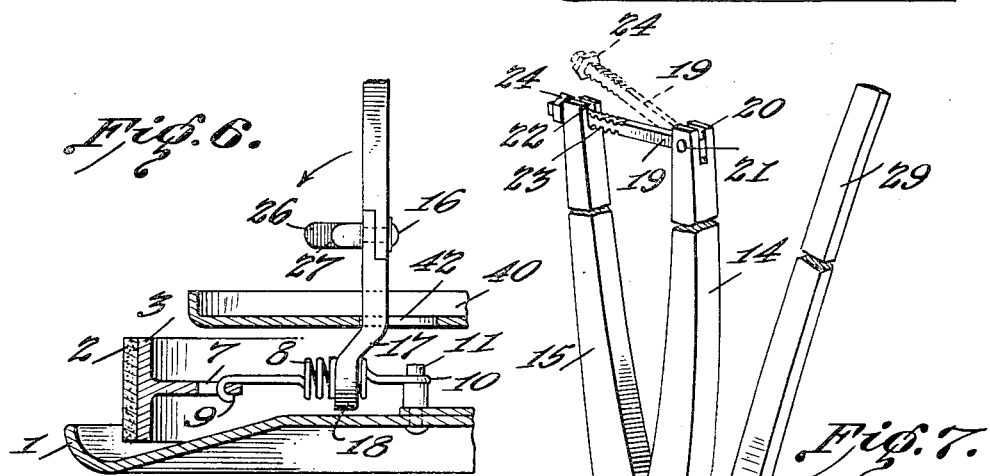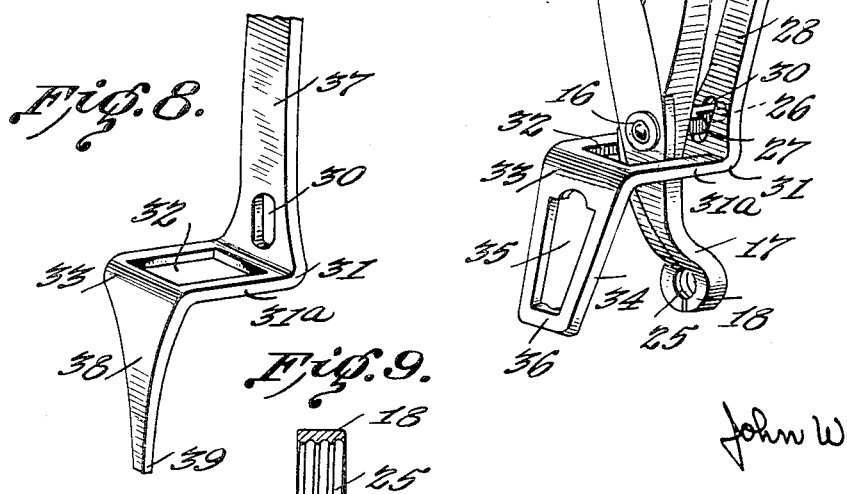

Patented Feb. 27, 1934

1,949,343

UNITED STATES PATENT OFFICE 1,949,343

APPLYING AND REMOVING TOOL

John Walter Wood, Buffalo Ridge, Va.

Application September 25, 1933
Serial No. 690,923

7 Claims. (Cl. 29—87.1)

This invention relates to certain improvements in applying and removing tools; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

Fundamentally, the invention relates to a tool primarily designed for applying and removing brake shoe retracting springs, and the mounting and combination of the various elements thereof. While the invention has been particularly designed for this use, it is apparent and to be understood that the tool may be used for purposes other than on brake springs, the mounting and combination of the various elements being such that a variety of uses are contemplated and come within the scope of this invention.

It is an object and feature of this invention to provide a tool of this type whereby the springs employed in retracting brake shoes may be readily and quickly removed to allow removal of the shoes, and with equal facility applied to the shoes for holding them in position.

Another object of the invention is to provide a tool so constructed that it will operate with equal facility on springs which are secured and tensioned either by being attached to binding posts or attached in holes or slots.

A still further object of this invention is to provide a tool which will apply or remove springs used on the service brake shoes without removing the hand brake shoe carrier plate.

It is also a feature of this invention to so construct a tool that its elements will cooperate to apply forces to the object being operated upon with the expenditure of the least amount of effort on the part of the operator of the tool.

Another object of this invention is to provide a tool for the purposes set forth which will reach springs placed in inaccessible places for their removal or their application to operative position.

It is a further object and advantage of this invention to provide a tool which may be controlled and used by one hand only of the operator thereof.

The invention includes as another feature thereof, a tool so constructed that one element thereof will act as a lever, the fulcrum point being on the other element of the tool.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a plan view of the braking elements of a vehicle wheel.

Fig. 2 is a plan view of the braking elements of a vehicle wheel, the hand brake shoe carrier plate being in position.

Fig. 3 is a plan view of the underside of the tool.

Fig. 4 is a section in elevation taken on the line 4—4 of Fig. 1, showing the tool in operative position.

Fig. 5 is a section in elevation taken on line 5—5 of Fig. 1, showing the tool in operative position when applied to a spring tensioned by hooking in a hole on the brake shoe.

Fig. 6 is a section in elevation taken on line 6—6 of Fig. 2, showing the tool in operative position, the hand brake shoe carrier plate being in position.

Fig. 7 is a perspective view of the tool as shown in Fig. 4.

Fig. 8 is a perspective view of one element of the tool for use on springs tensioned as in Fig. 5; the handle of this element being broken away.

Fig. 9 is a section of the tool taken on line 9—9, of Fig. 3, showing the clamping jaws.

In Figs. 1 and 2 of the accompanying drawings, I have disclosed the braking elements of an internal expanding vehicle brake mechanism in operative position, or the position in which they are found by the mechanic who has removed the vehicle wheel and the brake drum prior to removing the brake shoes, for instance, for purposes of relining. To remove the brake shoes, it is essential that the brake retracting springs be unhooked and again in assembling the braking elements it is of course necessary to hook the springs in their operative positions. Now I have found this to be a very difficult operation with the tools now known and in common use.

In Fig. 2 where the hand brake carrier plate is in position on the outside of the service braking elements, it is usually necessary to remove this plate in order to apply or remove the shoe retracting springs, but by the use of my tool, it is possible to perform this operation while the carrier plate remains in position, thereby saving much time and making for greater ease of operation.

As is well known, certain of such springs are attached in tensioning position by means of hooks at their ends which hook about binding posts while others are attached by securing the hooked ends in holes or slots formed in the objects being held.

By the use of my invention, it is now possible to apply or remove springs which are attached by either of these means and this I accomplish by a quick simple and efficient interchange of parts.

Referring to the drawings, I show the usual brake elements which are operatively secured to the brake housing plate 1 and housed within the brake drum (not shown), 2, is the brake lining which is secured on the brake shoes 3 in the usual manner. 4 is the brake adjusting shaft and 5 is the brake adjusting wedge. The numeral 6 is the brake shoe roller.

The brake shoes are provided with holes 7 near their ends for a purpose to be hereinafter set forth. The brake retracting springs in the particular disclosure herein described are of two types, the short retracting spring and the long retracting spring. It is to be understood that this invention is not to be construed as being limited for use only on the type of springs herein described as it contemplates operation on springs of various types.

The retracting springs which are shown in the drawings and which are commonly in use with brake shoes are the coil type of springs so constructed that their ends extend outwardly in a direction longitudinal of the coil for purposes of attaching and holding the spring under tension.

The short brake retracting springs are shown in the drawings at 8 and are formed as above described, with opposite ends bent to form hooks 9 and 10, the ends being so twisted that the hook 10 will lie parallel to the brake shoe 3 and the other hooked end 9 will be at right angles to hook 10 for hooking through the hole 7 in the brake shoe 3.

Binding posts 11 are formed on the brake housing plate 1 diagonally opposite the holes 7, the binding posts 11 being adapted to receive the hooked ends 10 of the springs 8 and hold said springs under tension since the opposite ends 9 of the springs are hooked in the holes 7 of the brake shoes 3, thereby holding the brake shoes 3 in retracted position from the brake drums.

The long retracting springs 12 in this particular instance, are formed with hooked ends 13 for hooking in holes 7 of the brake shoes, the springs 12 are therefore connected at both ends to the brake shoes.

The description thus far has presented the usual type of assembly of the working parts in an internal expanding brake mechanism and it is the application of my tool to this mechanism and the structure, arrangements and combination of parts thereof which I shall now describe in detail.

The tool comprises two crossed handle forming levers 14 and 15 connected together by means such as pivot 16. The levers 14 and 15 adjacent their forward ends are each similarly offset laterally, as at 17, and at their forward ends are each curved or bent to form opposed complementary clamping jaws 18. At their opposite or handle-forming ends, the levers 14 and 15 are provided with means for tightening or drawing the handle ends of the levers toward one another, thereby forcing the clamping jaws 18 together and locking them under pressure around the object about which they are clamped.

This lever locking means consists of a locking lever 19, (Fig. 7) which is secured in a slot 20 cut in the upper end of lever 14, for swinging or pivotal movement on a pin 21 in said slot. The opposite end of the locking lever 19, when in locking position, is adapted to fit into a slot 22, formed in the upper end of lever 15. The locking lever is threaded as at 23, inward a distance from its outer end, to receive a nut 24 on that part of locking lever 19 which extends beyond the lever 15. By swinging the locking lever upwardly as shown in dotted lines in Fig. 7, the levers 14 and 15 are released and may be moved apart, thereby separating the clamping jaws 18 to pass about an element to be clamped; then by swinging lever 19 into locking position in slot 22 and tightening or screwing nut 24, the jaws 18 will be locked in tight clamping position.

The inner opposing surfaces of the clamping jaws 18 are threaded as at 25, the size of the threads varying according to the size of the coils of the springs being clamped. Such an arrangement is accomplished by providing different tools for different sized springs. In this manner, a firm grip is obtained upon the spring by the jaws and the spring is held firmly against accidental slipping regardless of the amount of force applied to the tool. This design and arrangement is clearly shown in Fig. 9 of the drawings, where the clamping jaws 18 are disclosed clamped about a spring such as the spring 8, the threads being of a size to properly receive the spring coils.

The pivot pin 16 extends through and upwardly beyond the levers 14 and 15 and forms a post or pin 26 having a rounded shoulder formed thereon as disclosed in the drawings at 27.

A third lever or fulcrum arm 28 is provided for mounting and pivotal movement on this post 26.

The fulcrum arm 28 provides a handle 29 of approximately a length equal to that of the levers 14 and 15 and is disposed and extends longitudinally of said levers. The fulcrum arm 28 is provided with a slot 30 at a point opposite post 26, said slot being provided to receive therein the post 26 for pivotal mounting of the arm thereon, and the slot 30 being longer than the width of post 26 and the slot is of such width that the edges of the slot will bear against the shoulder 27 on the post 26 whereby rocking movement of the fulcrum arm 28 toward and from levers 14 and 15, will occur with shoulder 27 acting as a bearing point therefor. It is also apparent that a limited amount of movement of arm 28 longitudinally of the levers 14 and 15 may occur due to the relative length of the slot with respect to the width of the post.

Directly forward of the pivotal mounting on levers 14 and 15, the fulcrum arm 28 is offset laterally as at 31 to form the section 31A extending transversely across levers 14 and 15, as is clearly seen by referring to Fig. 7 of the drawings.

The section 31A is centrally formed with a square opening 32 therein, the purpose of this being to allow the forward ends of levers 14 and 15 to pass therethrough when arm 28 is in operative mounted position on post 26.

At a point 33, adjacent the lower end of opening 32, the arm 28 terminates in a working nose 34 which extends forwardly and longitudinally to handle 29 and levers 14 and 15 on the opposite side of the forward end of crossed levers 14 and 15 from the fulcrum post 26. The nose 34 is of greater length than the length of adjacent section 31A, and is formed with a slight downward taper terminating in the blunt nose end 36, which is preferably though not necessarily, slightly concaved to snugly receive binding post 11.

The working nose 34 is also provided with an opening or cut-out section 35 of oblong tapering shape.

When the fulcrum arm 28 is in operative mounted position and forming part of the tool combination, the working nose 34 will lie adjacent clamping jaws 18, and it is to be understood that because of the mounting of arm 28 for swinging or rocking movement on post 26, such movement will of course vary the distance between the jaws 18 and nose 34.

The fulcrum arm 28 which is shown in Fig. 7 of the drawings, is mounted on post 26 for co-operation with the crossed levers 14 and 15 when a spring is to be applied or removed which is attached in a particular manner, the operation of this particular combination will be described hereinafter.

In Fig. 8 of the drawings, I disclose a fulcrum arm 37 of construction and design similar to the arm 28 described in detail above, except that the working nose 38 of this arm is so designed in forwardly tapering form as to terminate at its forward end in a point 39. This fulcrum arm 37 is mounted on the post 26 of crossed levers 14 and 15 in like manner as arm 28 and its purpose and operation will be described in detail hereinafter.

Referring to Fig. 2 of the drawings, I show there the braking control elements present in Fig. 1 and in addition the hand brake shoe carrier plate 40 secured in position on the brake housing plate 1, by means of nuts and bolts 41. This plate 40 is provided with a circular series of holes or openings 42 cut therein.

Often it is desirable and advantageous not to have to remove the plate 40 when the brake shoes 3 are to be removed. By use of my invention, it is now possible to remove the brake shoes without removing plate 40, which operation will be described hereinafter.

I shall now describe the operation and manner of using my invention when in actual use in applying or removing a spring which, when attached in operative position, is held under tension by securing at least one end thereof about a binding post or the like.

The fulcrum arm 28 is first mounted in position on post 26 on crossed levers 14 and 15, arm 28 having been brought into this position with respect to the crossed levers by passing the forward end of levers 14 and 15, through the opening 32 in section 31A of arm 28. With the elements of the tool so mounted and combined, it is apparent that arm 28 may be rocked on its pivot point or post 26 while the crossed levers 14 and 15 remain stationary. Now the construction making this possible is the provision of the opening 32 of a size sufficiently large to receive the jaws 18 therethrough and to permit of this rocking movement while crossed levers 14 and 15 are in position passing through said opening.

After the elements have been so mounted and are in position with respect to one another as described, the tool is now attached to the spring to be operated upon. This I accomplish in the following manner.

The lever 19 being in upwardly swung non-locking position as shown by dotted lines in Fig. 7, the jaws 18 are opened by grasping the levers 14 and 15 and separating them. The jaws are then placed in position to be clamped about a spring 8, and by forcing the crossed levers 14 and 15 toward each other, the spring is firmly clamped and securely held by the jaws 18 and are locked there around by swinging locking lever 19 downwardly into slot 22 of lever 15 and screwing nut 24 inwardly against lever 15 to lock the levers in position for holding jaws 18 about the spring.

The crossed levers 14 and 15 and fulcrum arm 28 are then grasped in the hands of the operator of the tool and by rocking the arm 28 until the end 36 of working nose 34 is brought into position bearing against the binding post 11 on the side thereof opposite from the spring 8, the tool is in operative position for either removing or applying the spring.

This position is clearly seen by referring to Fig. 4 of the drawings which shows the invention in position at either the start of the spring removing operation or the finish of the spring applying operation.

Where the spring is under tension and in attached position, one end being secured to the post 11 and the other to the brake shoe and it is desired to remove it therefrom, the tool being in operative position as described above and shown in Fig. 4, the operator grasping the crossed levers 14 and 15 and the fulcrum arm firmly, exerts pressure on them tending to force them together in the direction of the arrows in Fig. 4, the arm 28 swinging or rocking on post 26 and the end of the working nose bearing against binding post 11, will increase the pressure of jaws 18 on spring 8, elongating it and forcing it toward the post 11 whereby the hook 10 will be freed and not held taut against the post by the spring pressure and the operator, by a quick movement, of the tool in a direction away from post 11, will lift the hooked end 10 above the post freeing it entirely therefrom, thereby releasing and unattaching the spring.

To apply the hooked end 10 over the post 11 after it has been released, the procedure is similar to that just described, the jaws 18 being clamped about the spring 8 and locked thereon and the end 36 of working nose 34 being brought to bear against post 11. The operator of the tool then forces arm 28 and levers 14 and 15 toward each other in the direction of the arrows in Fig. 4, thereby elongating the spring 8 to a point where the hooked end 10 will lie above binding post 11 where the end 10 may be slipped over and around the post.

When either fulcrum arm 28 or 37 is in position on post 26 for cooperating therewith in the tool's applying or removing use, it is to be understood that due to the particular combination and arrangement of the elements as set forth, the working nose will be in position on the opposite side of the crossed levers from that on which the arm 28 is mounted.

Where the spring is attached to the brake shoe by being hooked in holes or slots formed therein, the arm 28 is removed from the post 26 and off the crossed levers 14 and 15 which are withdrawn through opening 32 in section 31A and the fulcrum arm 37 having the working nose 38 terminating in the point 39 as disclosed in Fig. 8, is mounted on post 26 of crossed levers 14 and 15 in the same manner as just described in the case where the arm 28 is being used. Fig. 5, of the drawings shows the tool in initial position prior to actually removing or applying a spring which is attached by hooking in slots or holes 7, in brake shoe 3, with the end 39 of working nose 38 resting against the hooked end 9 of the spring, the jaws 18 being in position clamped about the spring 8. To actually remove the spring, the arm 37 is manipulated from initial position as shown in Fig. 5 until the point 39 bears against the inner edge of hole 7 beside the hooked end 9 and upon pressure being exerted on arm 37 and the crossed levers to bring the arm and the levers toward each other in the direction of the arrows, the spring 8 will be elongated which will release hooked end 9 from its position bearing against the edge of hole 7, and the operator of the tool by a quick movement of the entire tool in a direction away from hole 7 will lift the hooked end 9 above the hole 7 freeing it therefrom. To again secure the hooked end 9 in the hole 7; the point 39 is brought to bear against the edge of hole 7, the levers and arm being pressed toward each other until end 9 is in position above the hole; and by moving the entire tool toward the hole, the end may be slipped thereinto and secured against the edge thereof.

Thus by an interchange of fulcrum arms, the tool may be quickly used, regardless of the means of attaching the springs.

As pointed out, earlier in the specification, it is often necessary and desirable to remove or apply a spring while the hand brake shoe carrier plate 40 is still in position and the spring 8 is partly hidden and the posts 11 or holes 10 are entirely inaccessible to a tool, see Figs. 2 and 6. In this case, the crossed levers 14 and 15 are used alone, the fulcrum arm being removed prior to commencing the operation and manipulation of the tool.

Referring to Fig. 6, it will be seen that the tool is inserted into a hole 42 in plate 40 above the spring which is desired to be removed or applied. The plate 40 is so placed that the holes 42 are not directly above the spring 8 so that it is necessary to form the levers 14 and 15 with the offset 17 so that the jaws 18 will reach beyond hole 42 and under plate 40 to a point where they can be firmly clamped around the spring 8, see Fig. 6. After the jaws are clamped on the spring and locked thereon by the means hereinbefore explained, the flat or upper sides of crossed levers 14 and 15 will bear against the edges of the hole 42 and by pressing the tool against this edge in direction of the arrow, pressure will be exerted on the spring 8 and the hooked end 10 thereof will rise free of the binding post 11, and the spring will be released from the binding post for removal of the brake shoe 3. If the spring is unattached and it is desired to attach it, the tool is manipulated in a manner similar to that employed when removing the spring, the hooked end 10 of spring 8 is forced to a point above post 11 by operating tool in the direction indicated by the arrows, and is then passed down around the post, thereby attaching and holding the spring in position.

From the detailed description of my invention and its use it is seen that it is particularly adapted for use in garages and the like where vehicle braking mechanisms are being repaired, but it is within the contemplation of my invention that it is for use wherever springs are being attached and unattached from tensioned to inoperative position; and further it is within the scope of this invention to provide a tool for a wide variety of uses which is mounted and combined as described herein and as disclosed in the drawings attached hereto.

What I claim is:

1. A tool for applying and removing an element, embodying crossed pivotally joined handle forming levers having element clamping means at their forward ends, a fulcrum arm pivotally mounted on one side of said levers for rocking movement thereon toward and from said levers, and said fulcrum arm forward of its pivotal mounting on said levers offset laterally to extend transversely across said levers and terminating in a forwardly extending portion in operative position disposed on the opposite side of said levers from its pivotal mounting thereon for engaging a fixed structure adjacent the element for removing and applying said element.

2. A tool for removing and applying an element, embodying crossed pivotally joined handle forming levers having opposed element clamping jaws at their forward ends and provided with means at their opposite ends for locking said jaws in clamped position, a fulcrum arm pivotally mounted at one side of said levers and disposed longitudinally thereof for rocking movement toward and from said levers, said fulcrum arm forward of its pivotal mounting being offset laterally to form a section having an opening therein, through which the forward ends of said levers extend, and said arm terminating in a section extending forwardly on the opposite side of said levers from its mounting thereon for engaging a fixed structure adjacent said element.

3. A tool for removing an element embodying a lever terminating at its forward end in work contacting means, and a fulcrum arm pivotally mounted at one side of said lever for rocking movement thereon toward and from said lever, said arm forward of its pivotal mounting on said lever being offset laterally to extend transversely across said lever to the opposite side thereof from its pivotal mounting and said arm terminating in a forwardly extending work contacting element for cooperation with said forward working end of said lever for removing an element.

4. A tool for removing and applying an element, embodying crossed pivotally joined handle forming levers having opposed element engaging means at their forward ends, a fulcrum arm pivotally removably mounted at one side of said levers and disposed longitudinally thereof for rocking movement thereon toward and from said levers, said arm forward of its pivotal mounting being offset laterally to extend transversely across said levers to the opposite side thereof and terminating in a portion extending forwardly on the opposite side of said levers from the side of the pivotal mounting of the fulcrum arm thereon, and said portion tapering to a point at its forward end for insertion in a hole in the structure adjacent said element for applying or removing the element.

5. A tool for applying and removing springs and the like, embodying crossed pivotally joined handle forming levers having offset opposed clamping jaws at their forward ends and means at their opposite ends for locking said jaws in clamped position, a fulcrum post on one side of said levers at said pivot point, a fulcrum arm having a slot therein to receive said fulcrum post for pivotally mounting said arm thereon longitudinally of said levers for rocking movement toward and from the levers, and said arm forward of the slot formed therein being offset laterally to extend transversely across the levers to the opposite side thereof and terminating in a forwardly extended working nose portion for engaging fixed structure to which said spring is attached for removing or applying the spring.

6. A tool for removing and applying an element embodying crossed handle forming levers joined by a pivot pin, and having element contacting means at their forward ends, and said pivot pin having a vertical extension above said levers, and a fulcrum arm pivotally mounted on said pivot pin extension longitudinally of said levers for rocking movement thereon toward and from said levers, and said fulcrum arm forward of its pivotal mounting on said pivot pin extension offset to extend transversely of said levers and terminating in a portion extending forwardly on the opposite side of said levers from the side of the pivotal mounting of the fulcrum arm on the pivot pin extension, for engaging fixed structure adjacent the element to be removed or applied.

7. A tool for applying and removing an element embodying crossed pivotally joined handle forming levers having element clamping means at their forward ends, a fulcrum arm pivotally mounted on one side of said levers for rocking movement thereon toward and from said levers, said fulcrum arm forward of its pivotal mounting formed with a section having an opening therein through which the forward ends of said levers extend, and said arm terminating in a working nose portion on the opposite side of said levers from its mounting thereon for engaging a fixed structure adjacent said element, for applying and removing an element.

JOHN WALTER WOOD.